(12) United States Patent
Shih

(10) Patent No.: US 6,577,376 B1
(45) Date of Patent: Jun. 10, 2003

(54) OPTICAL DEVICE WITH VARIABLE NUMERICAL APERTURES

(75) Inventor: Hsi-Fu Shih, Chang-Hua Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 161 days.

(21) Appl. No.: 09/615,411

(22) Filed: Jul. 13, 2000

(30) Foreign Application Priority Data

May 10, 2000 (TW) ........................................ 89108886 A

(51) Int. Cl.[7] .............................. G02F 1/13; G11B 7/14
(52) U.S. Cl. ................... 349/202; 349/201; 369/44.26; 369/44.32; 369/44.37; 369/44.38; 369/94; 369/112.02; 369/112.07; 369/112.08
(58) Field of Search ................................ 349/201, 202; 369/44.32, 44.37, 44.38, 44.26, 112.02, 112.07, 112.08, 94

(56) References Cited

U.S. PATENT DOCUMENTS

| | | | | |
|---|---|---|---|---|
| 5,748,603 A | * | 5/1998 | Kim et al. | ................... 369/112 |
| 5,787,061 A | * | 7/1998 | Tsuchiya et al. | ............... 369/58 |
| 5,798,994 A | * | 8/1998 | Kamatani | ..................... 369/58 |
| 5,877,876 A | * | 3/1999 | Birdwell | ........................ 359/39 |
| 6,172,792 B1 | * | 1/2001 | Jepsen et al. | ................ 359/254 |
| 6,201,589 B1 | * | 3/2001 | Tombling et al. | ............ 349/141 |
| 6,304,312 B1 | * | 10/2001 | Tanabe et al. | .............. 349/201 |
| 6,370,093 B1 | * | 4/2002 | Tada et al. | ................ 369/44.25 |

\* cited by examiner

Primary Examiner—Robert H. Kim
Assistant Examiner—Andrew Schechter
(74) Attorney, Agent, or Firm—W. Wayne Liauh

(57) ABSTRACT

The present invention relates to an optical device with a variable numerical aperture (NA), which utilizes special optical properties of a liquid crystal medium. Through the design of external electrodes and a circuit control unit, the refraction index of the liquid crystal medium can be modulated by the external voltage so that the beam passing through the LCD produces diffraction. An optical device with a variable focal point is thus formed by combining this LC diffractive device and an objective lens. So the present invention provides an optical device with focal points of different numerical apertures by varying the external voltage, whereby the device can read optical disks of all specifications.

4 Claims, 18 Drawing Sheets

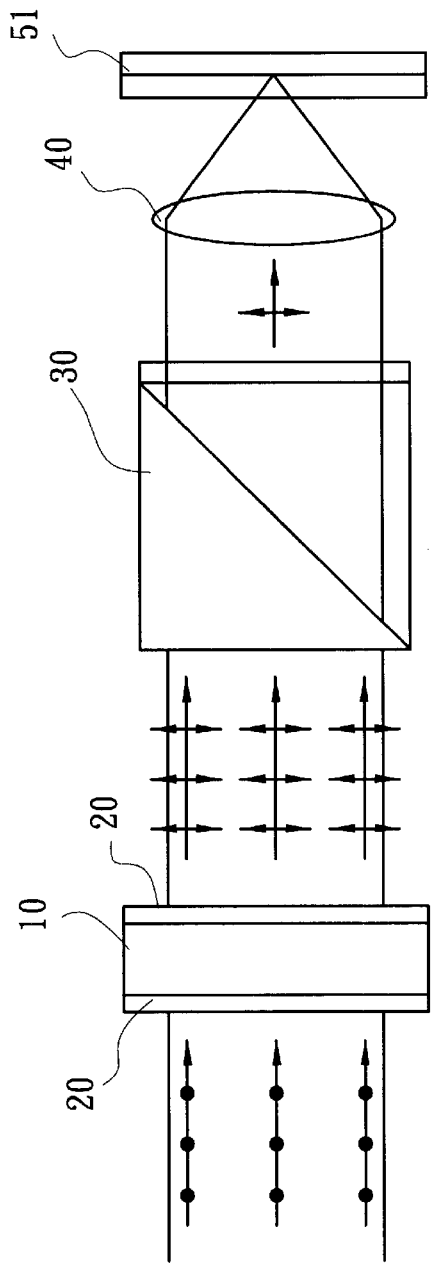
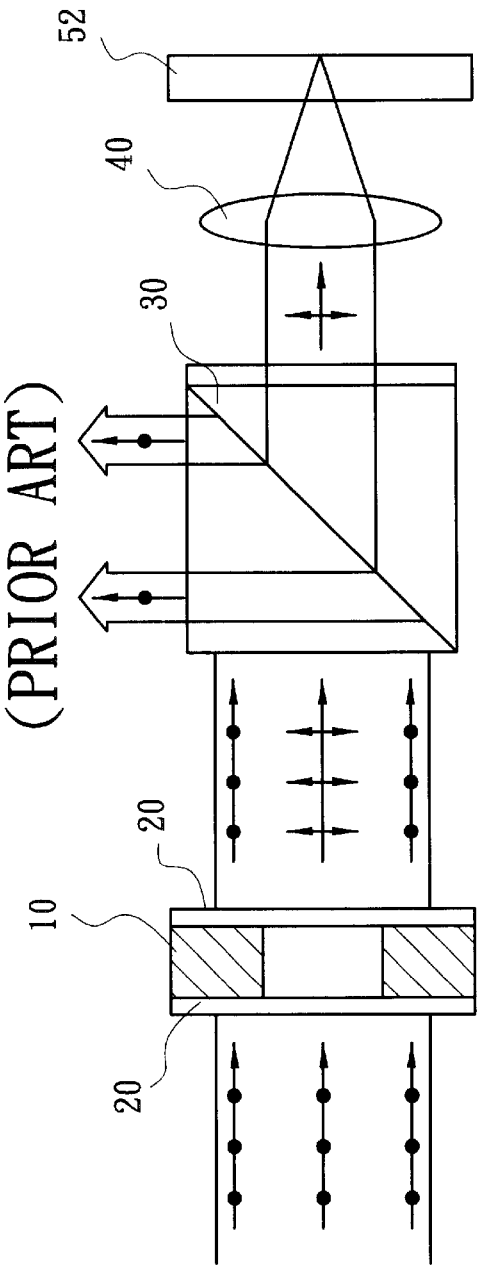
FIG. 1A (PRIOR ART)
FIG. 1B (PRIOR ART)

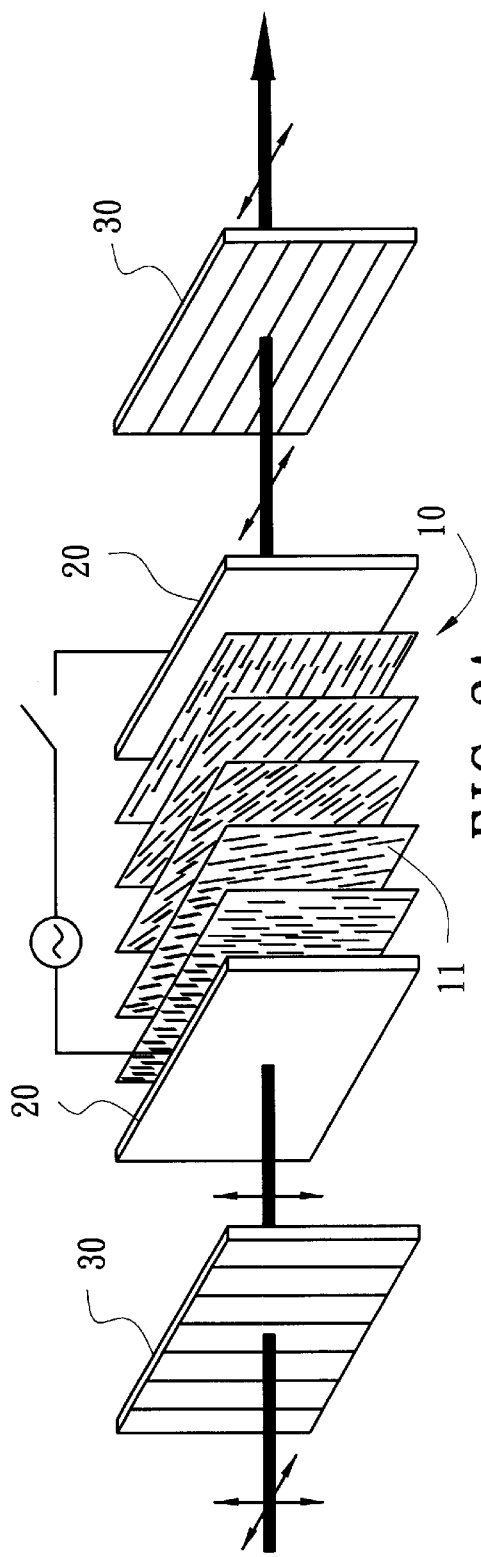
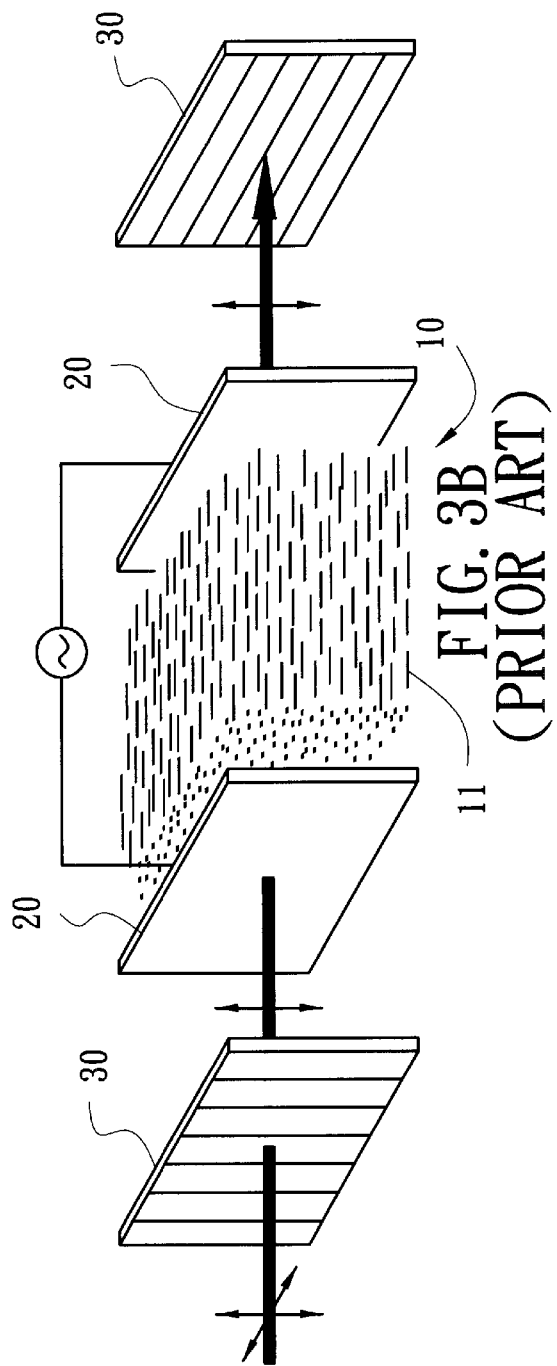
FIG. 3A (PRIOR ART)
FIG. 3B (PRIOR ART)

$C_1=292.6202$
$C_2=-21.4533$
$C_3=2.5610$
$C_4=-0.2826$
$C_5=0.0243$

OPTICAL DEVICE WITH VARIABLE NUMERICAL APERTURES

BACKGROUND OF THE INVENTION

1. Field of Invention

The present invention pertains to an optical device with variable numerical apertures. More specifically, the invention relates to an optical device that uses special optical properties of the liquid crystal device (LCD) and an external voltage to generate focal points of different numerical apertures (NAs).

2. Related Art

Due to higher compatibility requirements for compact discs (CDs) and digital versatile discs (DVDs) in commercial products, current DVD pick-up heads should be able to read old CDs besides DVDs. However, the optical pick-up head of the CD drive adopts an optical system with a numerical aperture (NA) of 0.45 and a wavelength of 780 nm, which is completely different from that of the DVD drive with the NA being 0.6 and the wavelength being 650 nm. Therefore, it is impossible to use the same set of objective lens and optical system to read optical discs having these two different specifications. To ensure the requirement of backward compatibility, devices using two switching objective lenses or one objective lens with dual focal points are proposed. The design of two switching objective lenses uses two objective lenses with different focal lengths and one of them is selected at a time according to the type of the optical disc (CD or DVD). The selection is achieved by using a driving device. This design, however, would increase the weight of the whole optical pick-up head system and the price of the product. Therefore, it becomes the trend to look for solutions in the designs of one objective with dual focal points.

There are already various inventions and designs of optical pick-up heads with dual focal points. For example, the invention disclosed in the U.S. Pat. No. 5,446,565 proposed by Matsushita Electric Industrial Co., Ltd. in 1995 is a compound objective lens which uses a holographic optical element (HOE) with an accompanying objective lens to obtain focal points corresponding to different NAs. The basic principle is that the HOE has a 0 order penetrating light and a +1 order diffractive light. When the 0 order light passes through the objective lens, it will be converged at the focal point with the original NA, whereas the +1 order diffractive light will be diverged as when passing through a divergent lens so that the original parallel light will first diverge by a certain angle and then get focused by the objective lens, thus lowering the NA. The above idea has been realized into commercial products; wherein they further inscribe a holographic pattern on the objective lens to form the so-called dual-focus objective lens. The advantage is in that one single objective lens has two different NAs, which can be used to read two different types of optical discs. Nonetheless, since both the 0 order and the +1 order light beams exist at the same time one of them would be wasted while using the other to read a specific disc. Thus, the energy usage efficiency is lowered. Also the yield is not high enough because the holographic pattern is inscribed on an aspherical objective lens.

There is another design similar to that of Matsushita Electric Industrial Co., Ltd., also using an HOE to form a compound objective lens. The difference is on that it is an application of two wavelengths whereby two corresponding NAs are obtained.

Furthermore, another method is to use a liquid crystal device (LCD) and a polarizer to control the diameter of the beam incident on the objective lens, thus controlling the NA value. Please refer to FIG. 1A. When the electrode 20 on an LCD 10 is open, the whole LCD 10 plays the role of a birefringent medium which rotates the polarization of the incident light by 90 degrees so that the light with the rotated polarization can wholly pass through a polarization beam splitter (PBS) 30 and reach an objective lens 40. At this moment, the NA is that of the objective lens 40. With reference to FIG. 1B, if the electrode 20 on the LCD 10 is closed, the portion around which being plated with the electrode 20 will generate an electrical field in the interior of the LCD 10 due to the imposed external voltage. This electrical field changes the orientation of the liquid crystal molecules so that that area of the LCD 10 changes to a medium with only one refraction index. Thus, the polarization of light within the outer ring does not change after passing through the LCD 10 and will be reflected by the PBS 30. Nevertheless, the light in the inner ring is still rotated by 90 degrees and can penetrate through the PBS 30. Therefore, only the central part of the beam will pass through the objective lens 40 and converge so as to effectively minimize the NA. In summary, the prior art uses the switching on electrodes on the LCD 10 to control and change between different NAs in order to read optical discs of different specifications. Yet this design will encounter slight spherical aberrations when the thickness of the disc varies.

In addition, there is another technique which uses an LCD in the optical pick-up head. This technique is not for the application of dual focal points in reading different optical discs. Instead, it makes use of the birefringent property that refraction indices of the liquid crystal will change in response to the variation of an external electrical field to modify the optical path difference of an incident light. The design of the electrode pattern on the LCD can control the distribution of the refraction index and thus change the wave front of the incident light, correcting the coma aberrations caused by a disc tilt. This technology is particularly designed for optical discs with high capacities, high densities and sensitive to the tilting problem.

It is for sure that the development of optical pick-up heads must be evolved toward the direction of being able to read optical discs with higher capacities and densities while at the same time considering the issue on compatibility with those in the old formats, i.e. the so-called backward compatibility. Therefore, DVD pick-up head designs must take into account the backward compatibility with CDs. It is expected that if the new generation of optical discs comes out, there must be similar concerns about backward compatibility with CDs and DVDs for the new optical pick-up heads too. When the storage density of discs gets higher, the NA of the objective lens must increase in order to minimize the light spot. However, increasing NA is likely to result in aberrations due to a small amount of tilt between the disc and the objective lens. A thinner substrate is thus needed to avoid coma aberrations. This will in turn cause spherical aberrations. Then it is necessary to solve the compatibility problem among discs of several different thickness, capacities and densities. The aforementioned state of art only considers the compatibility in two types of optical discs. So it is advantageous to invent a simple scheme to solve the compatibility issue for more than two types of discs.

SUMMARY OF THE INVENTION

In view of the foregoing, the present invention provides an optical objective lens having several different numerical apertures (NAs) so as to have distinctive focal points for different types optical discs.

Another object of the present invention is to solve the problems of optical aberration corrections present in optical discs with high capacities and densities.

According to the above-mentioned objects, the present invention provides an optical device having variable NAs, which uses the special properties of the liquid crystal device (LCD) with external transparent electrodes and a circuit control unit to control the refraction index of the liquid crystal (LC) medium by imposing an external voltage. This design can achieve the diffraction effect similar to that of a phase grating.

The above concept of the LC grating is further used to design a diffractive optical element and to combine with an objective lens. When the external voltage is absent, the LCD is completely transparent and there is no diffraction. At this moment, the light spot converged by the objective lens is the original focal point of the objective lens (i.e., the system has the original NA of the objective lens). When the external voltage is imposed, the LCD will be modulated into a diffractive optical element by the electrical field and the diffracted light is converged at another focal point (i.e., producing another NA). This new focal point is different from the original one and is suitable another type of optical discs. Therefore, the present invention can switch among focal points needed for different types of optical discs by controlling on and off of the external voltage. That is, the optical device of the present invention can have at least two focal points. If the electrodes of the LCD are further designed with many different patterns or having different external voltages, a variety of diffracted beams can be obtained through the switching and control on the external voltages, which diffracted beams are then converged by the objective lens into distinctive focal points suitable for optical discs of different specifications.

Furthermore, the LC grating can be generalized into the LC hologram, which then combines with an objective lens to form a compound lens. The LC hologram can be controlled by an external voltage so that the diffracted focal point will have small changes in response to the small changes in the hologram pattern. This further finely corrects the out-of-focus problem due to inhomogeneous thickness between the two data storage layers in the optical discs with high capacities and densities.

These and additional objects and advantages, as well as other embodiments of the invention, will be more readily understood after a consideration of the drawings and the detailed description of the preferred embodiments.

BRIEF DESCRIPTION OF THE DRAWINGS

FIG. 1A depicts a conventional method of controlling NA using an LCD and a polarizer, wherein the imposed external voltage is off;

FIG. 1B depicts a conventional method of controlling NA using an LCD and a polarizer, wherein the imposed external voltage is on;

FIG. 3A depicts the orientation of LC molecules under no external voltage and their polarization characteristics before and after an incident light passes through;

FIG. 3B depicts the orientation of LC molecules under an external voltage and their polarization characteristics before and after an incident light passes through;

In the various drawings, the same references relate to the same elements.

DETAILED DESCRIPTION OF THE INVENTION

Using optical characters of liquid crystal (LC), the present invention provides a holographic optical element (HOE) with LC as its essential material. Through the pattern design of external electrodes, the diffraction properties of the HOE can be controlled by the voltage imposed on the external electrodes. That is, under the action of different voltages on different electrodes, the HOE presents various corresponding diffraction effects.

Figure 2A:
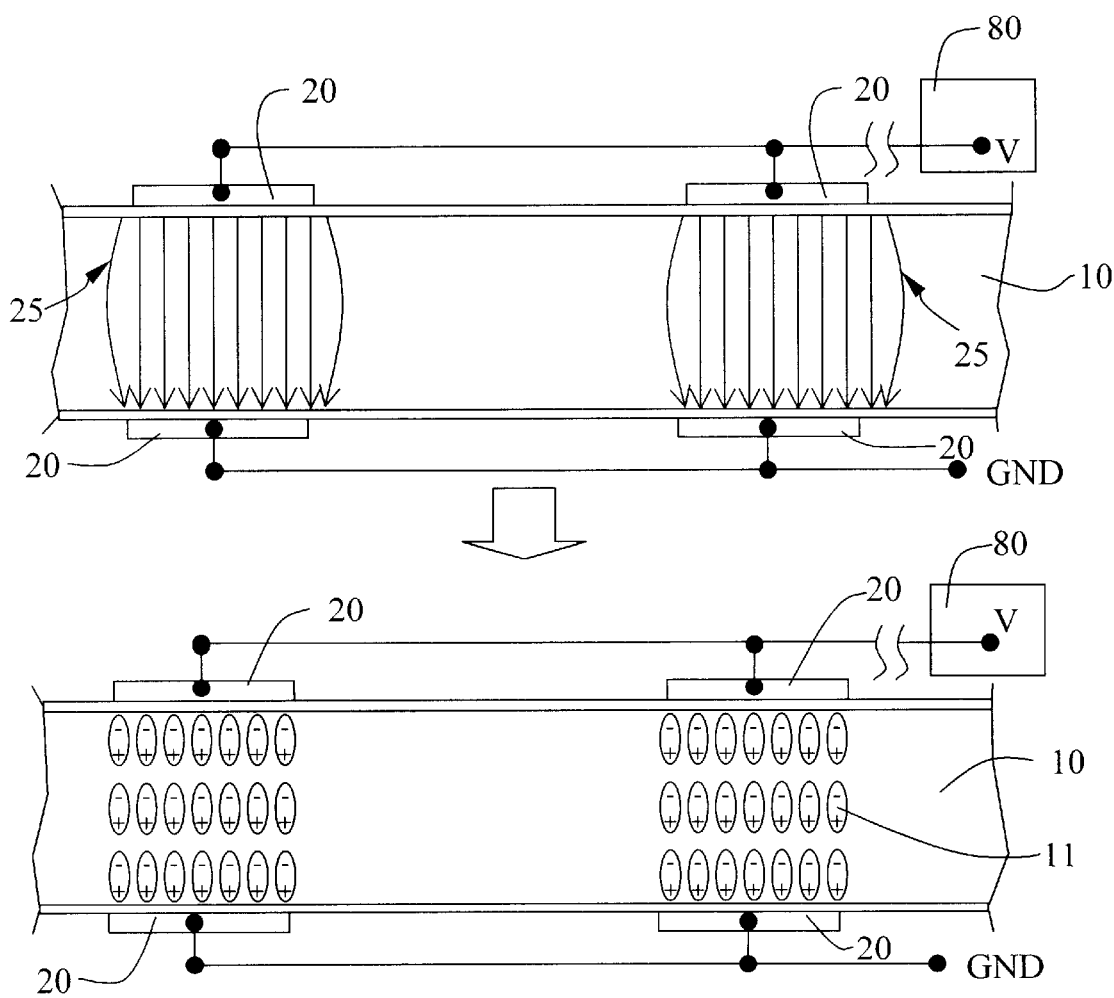
FIG. 2A is a schematic view showing an embodiment of a binary grating using LC according to the present invention.
Figure 2B:
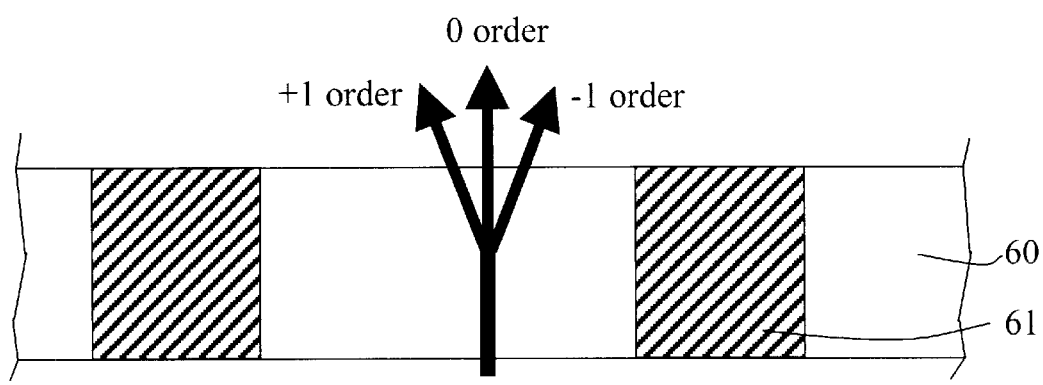
FIG. 2B is a schematic view of a binary grating.

Please refer to FIG. 2A, which is a schematic view showing an embodiment of a binary grating using LC according to the above concept of the present invention and its diffraction properties. The drawing shows that a circuit control unit 80 closes the electrode circuit 20 on the LCD 10 and thus an electric potential 25 is produced within the LCD 10, changing the orientation of LC molecules 11. This is effectively like a phase grating 60 etched with a binary pattern 61, as in FIG. 2B. When the electrode is open, the LCD is completely transparent and does not produce diffraction. A compound objective lens similar to that disclosed by Matsushita Electric Industrial Co., Ltd. can be formed by combining this binary grating and an objective lens, achieving the effect of generating NAs for optical discs with different specifications. The present invention, however is distinct from that of Matsushita Electric Industrial Co., Ltd. in that the external voltage can be used to control whether the HOE is in action so as to prevent unnecessary diffractions of the HOE when using the original NA of the objective lens. This design can fully utilize the energy of the laser beam.

Figure 4A:
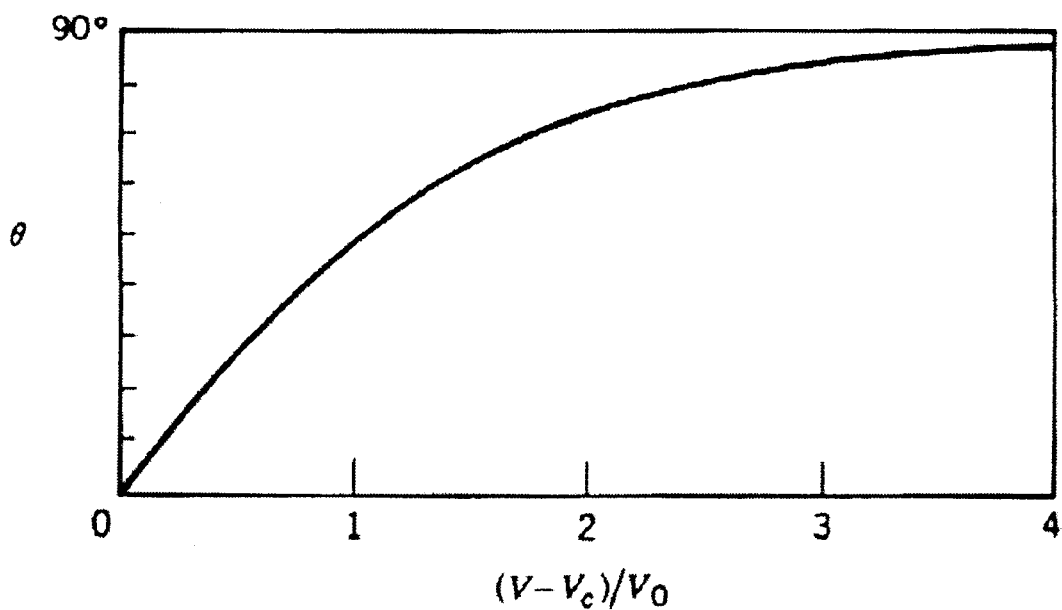
FIG. 4A shows a characteristic curve of the rotation angle of LC molecules under the external voltage.
Figure 4B:
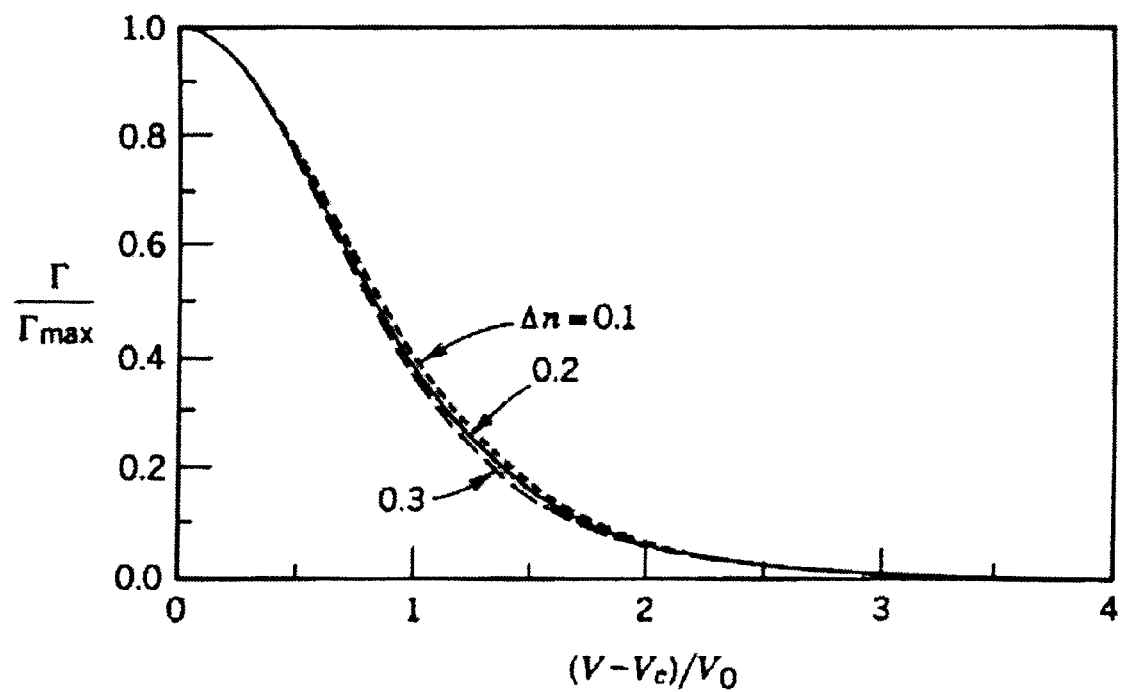
FIG. 4B shows a characteristic curve of phase retardation in LC due to the external voltage.

To implement the present invention, it is to be first considered whether using the LCD to manufacture diffraction elements is feasible. Referring to FIG. 3A, the drawing depicts the orientation of LC molecules under no external voltage and their polarization characteristics before and after an incident light passes through; and FIG. 3B depicts the orientation of LC molecules under an external voltage and their polarization characteristics before and after an incident light passes through. FIG. 4A shows a characteristic curve of the refraction index change when LC molecules are rotated by an angle $\theta$ due to an external voltage; and FIG. 4B shows a characteristic curve of phase retardation in the incident light before and after it passes through the LC medium due to an external voltage. From these four plots, one can see that the external voltage can indeed change the refraction index of the LC. Therefore, if a periodic external voltage is provided to modulate the LC, the LC will have a periodically varying refraction index, achieving the effect of splitting an incident light into several diffraction beams like a phase grating does. The diffraction efficiency can be determined by controlling the etching depth of the grating pattern and the duty cycle as in a phase grating. The electric field distribution between the electrodes of the LCD diffraction device in the invention can be calculated from the external voltage imposed. The electric field in turn determines the variation of the refraction index. With the thickness between the two LC layers, the optical path difference (phase different) between the modulating area under the external voltage and the non-modulating area under no external voltage can be determined, which then gives the diffraction efficiency.

Figure 5A:
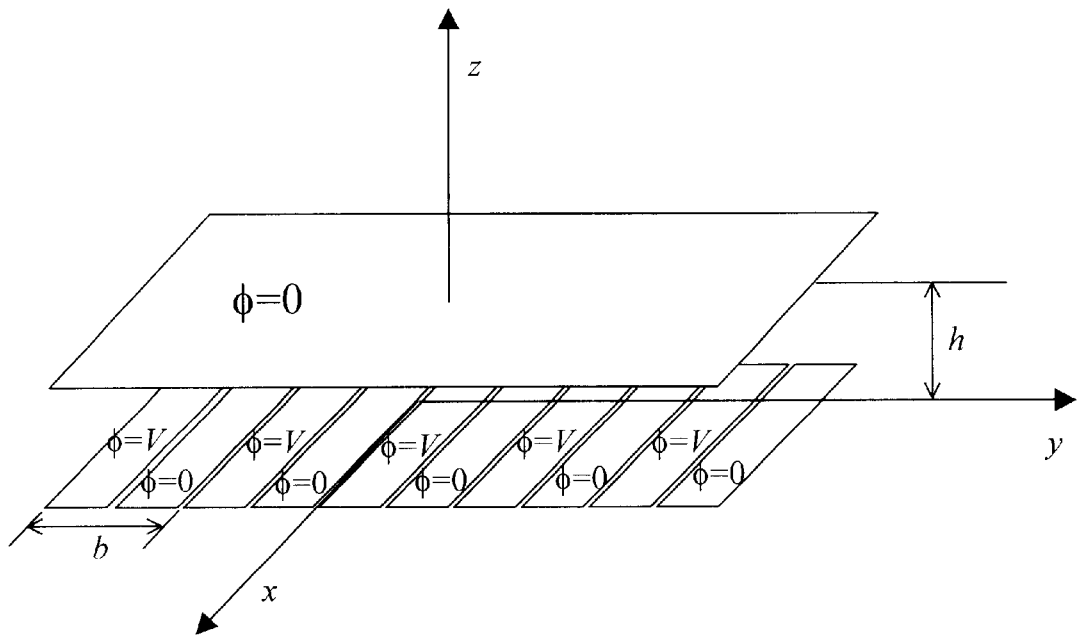
FIG. 5A depicts an exemplary theoretical calculation result of an electric potential.

With reference to FIG. 5A, the electrostatic potential and electrostatic field between the electrodes are solved for a periodic voltage under specific boundary conditions:

$$\phi(x,y,z) = \sum_{n=1,3,5,...}^{\infty} \frac{-4V}{n\pi \sinh\left(\frac{2n\pi h}{b}\right)} \cdot \sin\left(\frac{2n\pi y}{b}\right) \cdot \sinh\left(\frac{2n\pi(z-h)}{b}\right),$$

$$E_x(x,y,z) = \frac{\partial \phi}{\partial x} = 0,$$

$$E_y(x,y,z) = \frac{\partial \phi}{\partial y} = \sum_{n=1,3,5,...}^{\infty} \frac{-8V}{b\sinh\left(\frac{2n\pi h}{b}\right)} \cdot \cos\left(\frac{2n\pi y}{b}\right) \cdot \sinh\left(\frac{2n\pi(z-h)}{b}\right),$$

$$E_z(x,y,z) = \frac{\partial \phi}{\partial z} = \sum_{n=1,3,5,...}^{\infty} \frac{-8V}{b\sinh\left(\frac{2n\pi h}{b}\right)} \cdot \sin\left(\frac{2n\pi y}{b}\right) \cdot \cosh\left(\frac{2n\pi(z-h)}{b}\right).$$

Figure 5B:
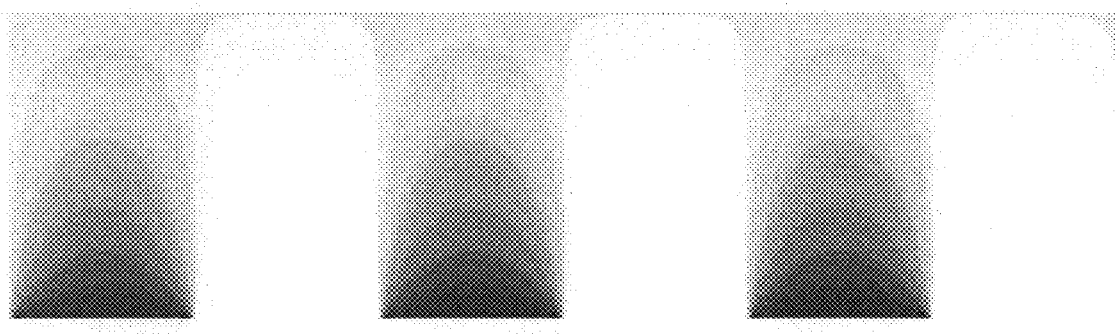
FIG. 5B depicts a simulated electric potential.

This electric field is further used to simulate the actual intensity distribution. Since the LC refraction index and the external electric field intensity have the following relation:

$$\frac{1}{n^2(\theta)} = \frac{\cos^2\theta}{n_e^2} + \frac{\sin^2\theta}{n_0^2},$$

$$\theta = \begin{cases} 0, & E \leq E_c \\ \frac{\pi}{2} - 2\tan^{-1}\exp\left(-\frac{E-E_c}{E_0}\right), & E > E_c \end{cases},$$

where $\theta$ is the rotation angle of LC molecules under the external field, $E_c$ is the critical electric field, and $E_0$ is a constant. One can obtain a simulated distribution as in FIG. 5B using the above fomulas. One can also see this periodic distribution is just like the graded index distribution of a phase grating.

Furthermore, the HOE made of LC can have different diffraction grating patterns on the upper and lower surfaces using transparent electrodes for different diffraction beams. A specific HOE pattern is designed for a particular optical disc of any thickness and the corresponding NA. When a certain type of optical disc is given, the corresponding electrode will be imposed with a particular voltage so that the diffraction character of the HOE at this moment can make the beam converged by the objective lens have a specific NA and eliminate spherical aberrations induced by thickness variations among different discs. Therefore, the compound objective lens of the disclosed invention has variable NAs to generate distinctive focal points for reading optical discs of different specifications.

Figure 6A:
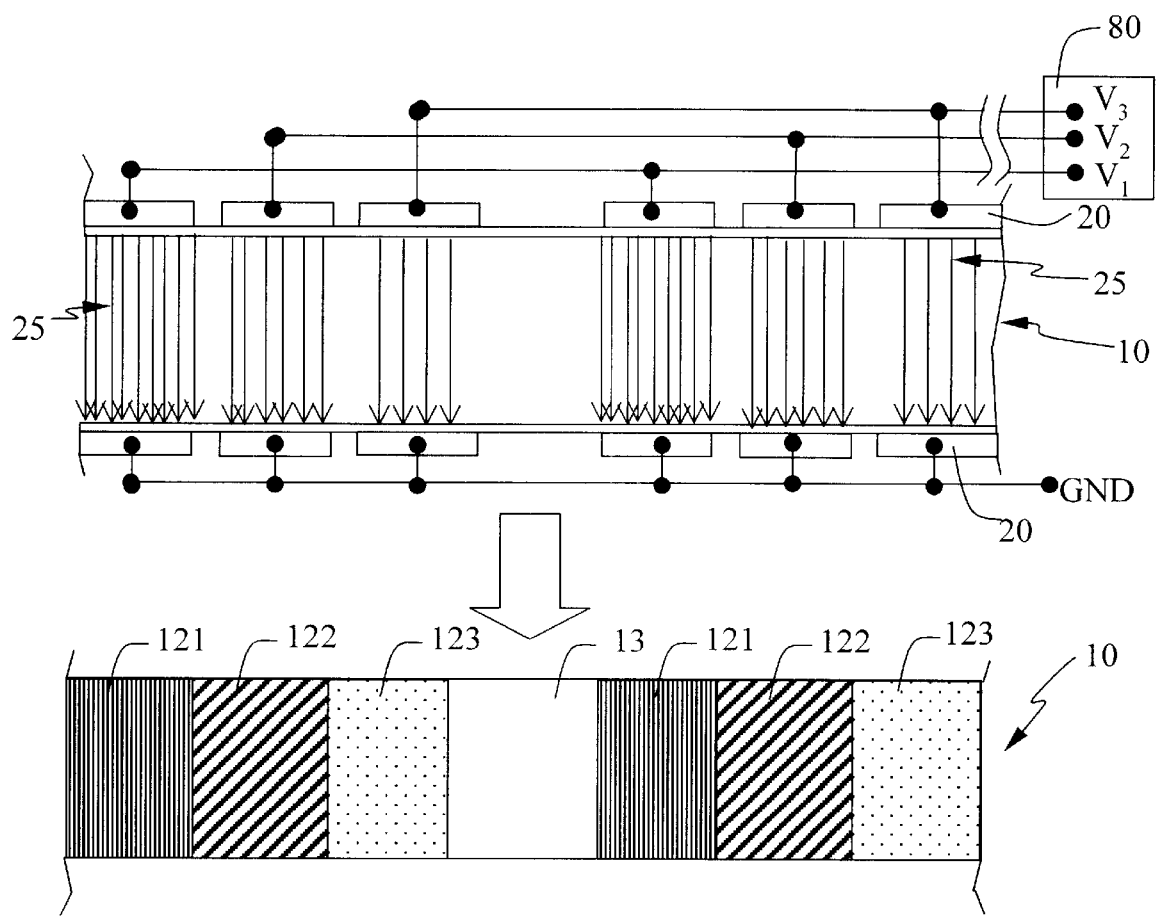
FIG. 6A is a schematic view of a multi-level grating embodiment using LC according to the present invention.
Figure 6B:
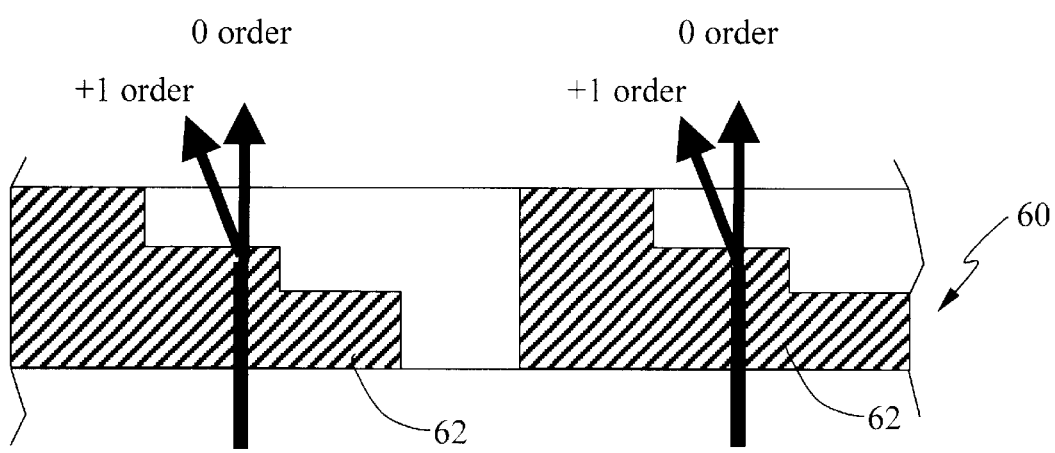
FIG. 6B is a schematic view of a four-level grating.

Referring to FIG. 6A, the LC refraction index is controlled by applying different voltages on different electrodes 20 so as to implement a multi-level phase grating 60. The upper and lower surfaces of the LCD 10 in the drawing are coated with three different electrodes 20 with voltages $V_1$, $V_2$ and $V_3$. Through a circuit control unit 80 the voltages are controlled to have $V_1>V_2>V_3$ and all are closed. This will generate a $V_1$ voltage pattern area 121, a $V_2$ voltage pattern area 122 and a $V_3$ voltage pattern area 123 on the LCD 10. With the addition of a no voltage area 13, there will be diffractions equivalent to the ones produced by a phase grating 60 etched with a four-level pattern 62, as illustrated in FIG. 6B. Nevertheless, the multi-level grating disclosed herein can effectively suppress the −1 order diffraction light and hence increase the utilization efficiency of the laser output light.

Figure 7A:
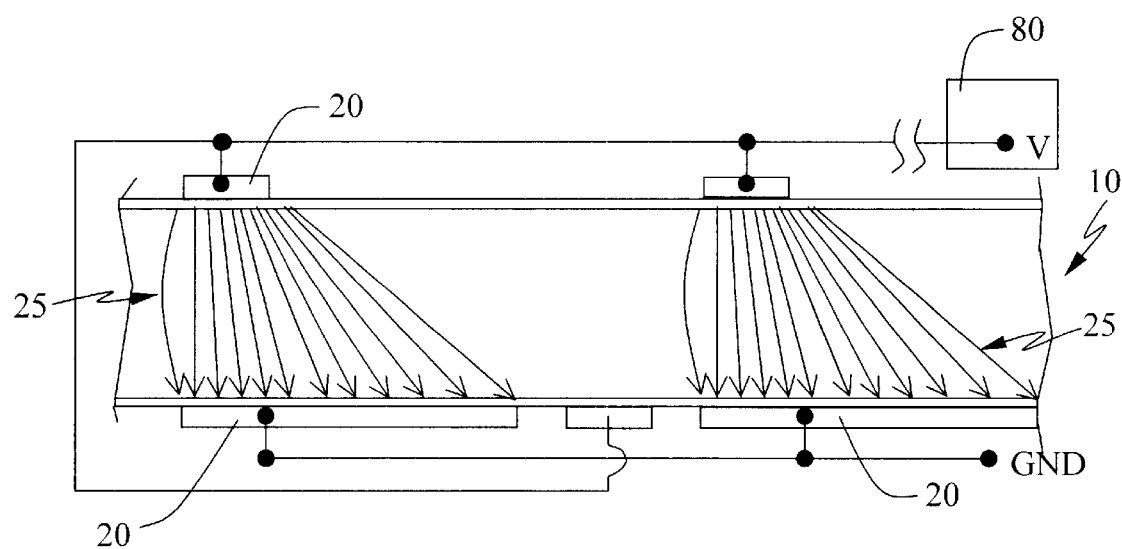
FIG. 7A is a schematic view of a blazing grating embodiment using LC according to the present invention.
Figure 7B:
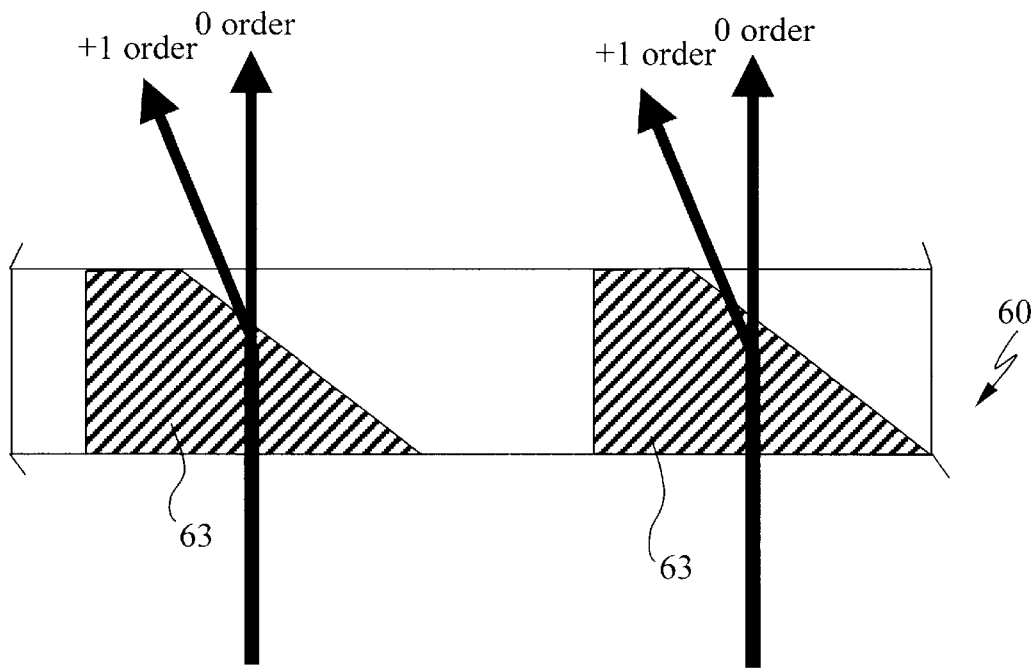
FIG. 7B is a schematic view of a blazing grating.

FIG. 7A shows a case where the grating is further designed to be applicable for the blazing. Through the design of the upper and lower surface electrodes 20 with unequal areas, the electric field 25 inside the LCD 10 can be controlled to have a seesaw distribution, as if the grating is etched with a blazing pattern 63. As shown in FIG. 7B, this invention achieves the goal of a blazing phase grating 60. It is also noted that the parameters such as the desired electric field distribution and electrode areas can be obtained from the calculation of the electrostatic field 25.

Figure 8A:
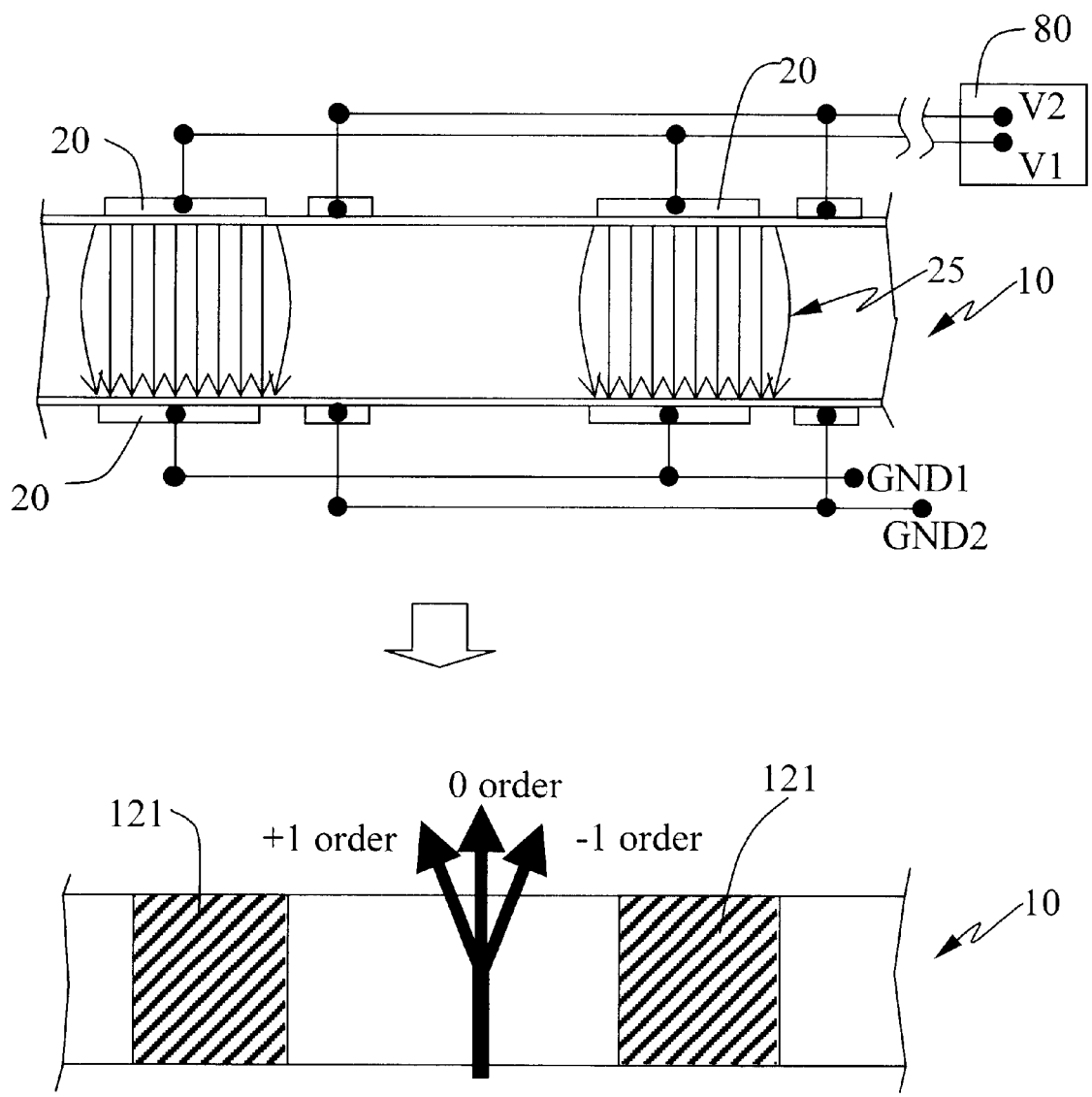
FIG. 8A is a schematic view of an LC grating having switchable patterns, wherein the $V_1$ electrode is closed while the $V_2$ electrode is open.
Figure 8B:
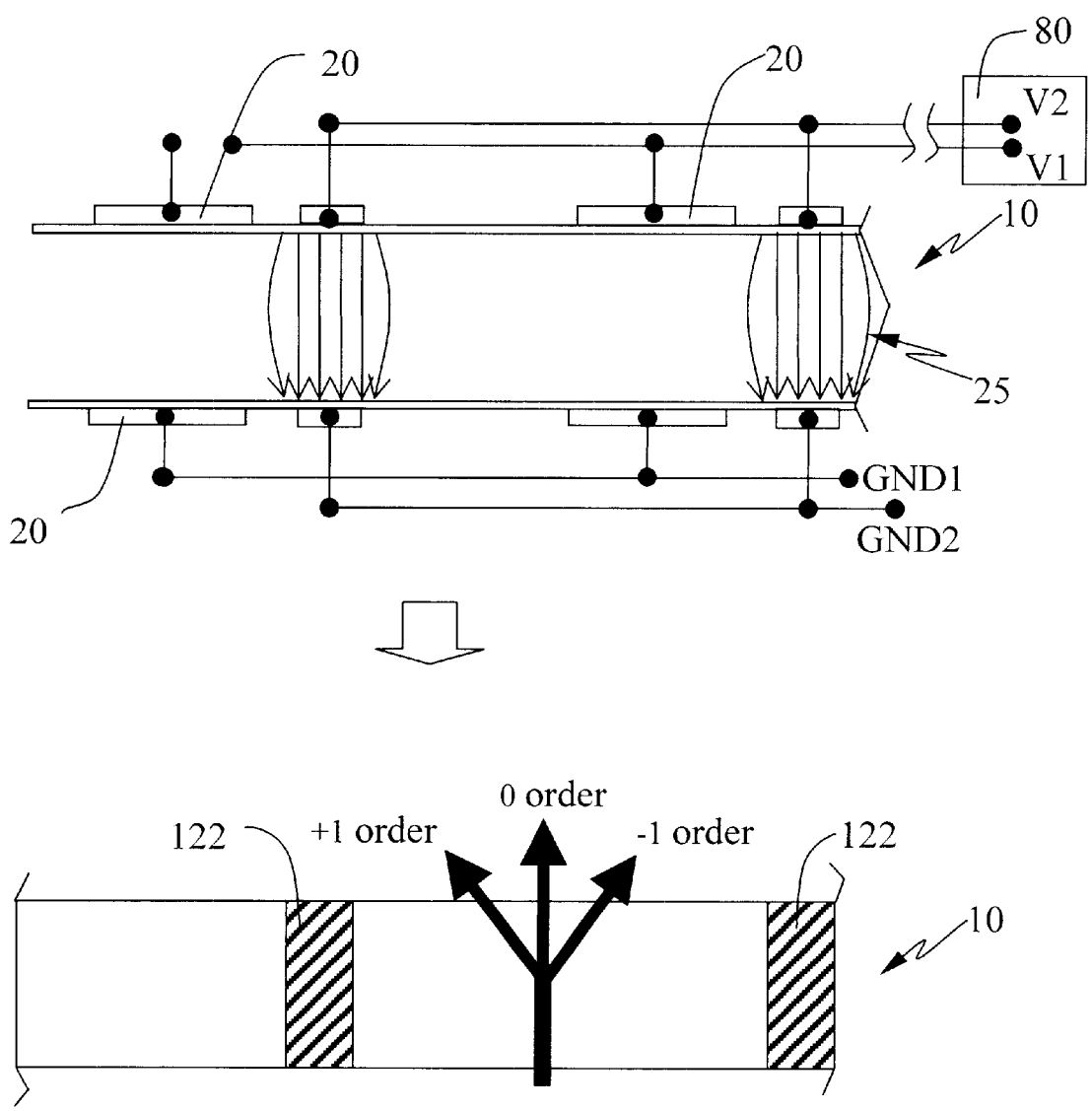
FIG. 8B is a schematic view of an LC grating having switchable patterns, wherein the $V_2$ electrode is closed while the $V_1$ electrode is open.

With reference to FIGS. 8A and 8B, when the LCD surfaces 10 are simultaneously coated with two sets of different electrodes 20, e.g., $V_1$ and $V_2$, different grating diffraction effects can be achieved by switching the voltages applied on different electrodes 20 using a circuit control unit 80. FIG. 8A shows that $V_1$ is closed and $V_2$ is open, while FIG. 8B shows that $V_2$ is closed and $V_1$ is open.

Figure 9A:
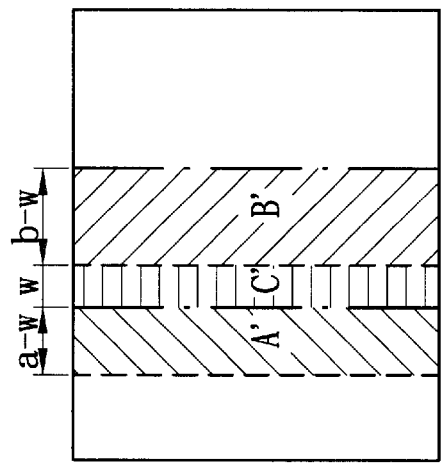
FIG. 9A is a schematic view showing the overlapping of the areas covered by the two sets of electrode in the present invention.
Figure 9B:
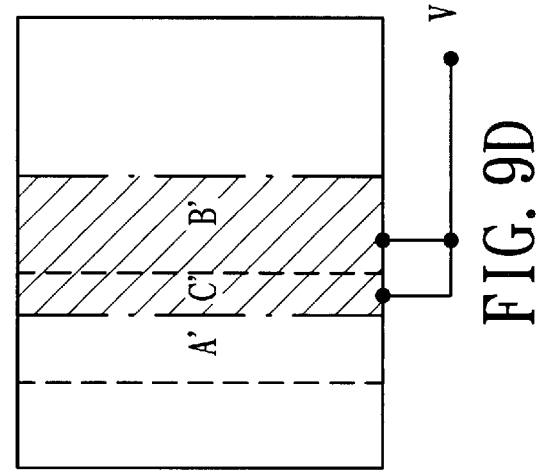
FIG. 9B shows an area partition method to solve the situation in FIG. 9A.
Figure 9C:
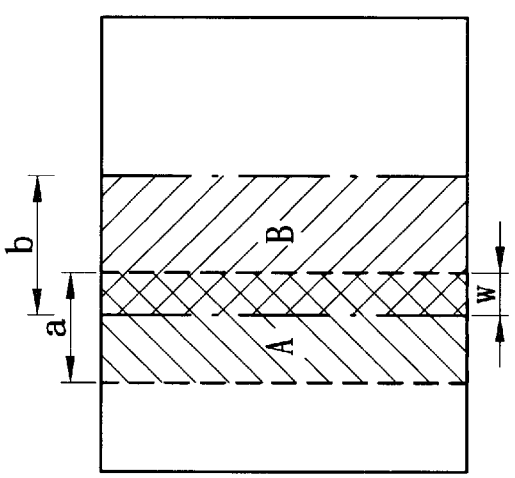
FIG. 9C shows an electrode corresponding to a first diffraction pattern given by the design in FIG. 9B.
Figure 9D:
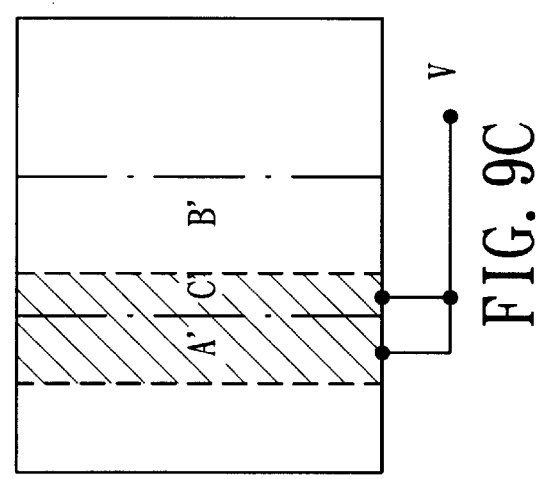
FIG. 9D shows an electrode corresponding to a second diffraction pattern given by the design in FIG. 9B.

If the covered areas of the aforementioned two sets of different electrodes overlap, as shown in FIG. 9A, wherein the $V_1$ electrode covers area A with a width a and the $V_2$ electrode covers area B with a width b, and a portion with a width w is overlapped. Then the design in FIG. 9B can be employed to apply voltages to area A' with a width a-w, area C' with a width w and area B' with a width b-w. When one wants to have the diffraction pattern produced by the voltage $V_1$, then the electrodes in areas A' and C' are closed, as shown in FIG. 9C. Similarly, when one wants to have the diffraction pattern produced by the voltage $V_2$, then the electrodes in areas B' and C' are closed, as shown in FIG. 9D.

Figure 10A:
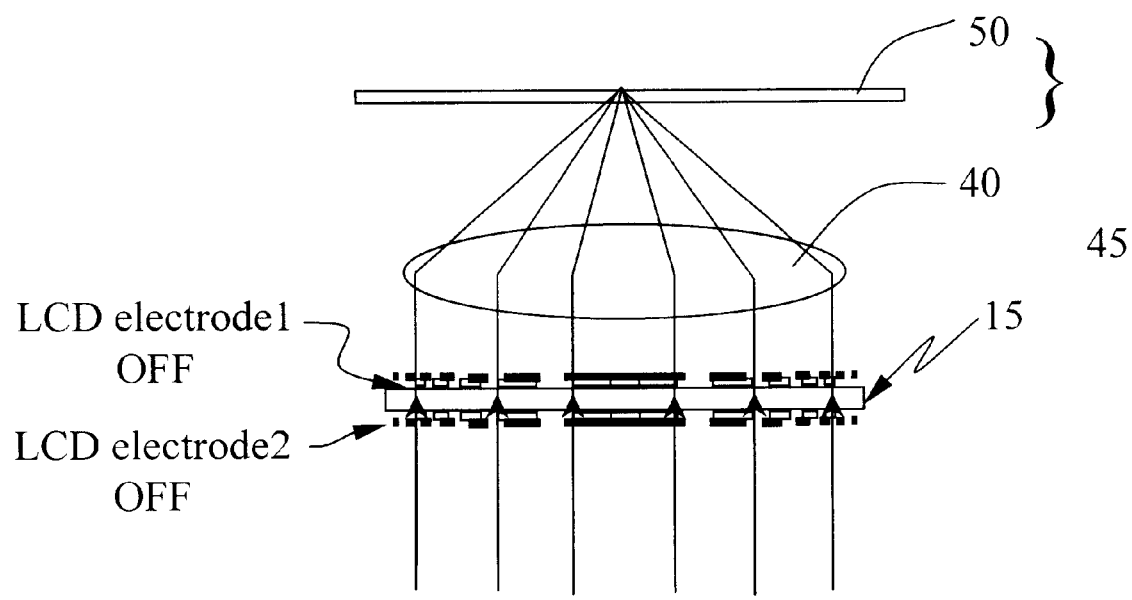
FIG. 10A shows how a compound objective lens composed of an LC hologram and an objective lens reads an optical disc when there is no electric power provided on the LCD electrode.
Figure 10B:
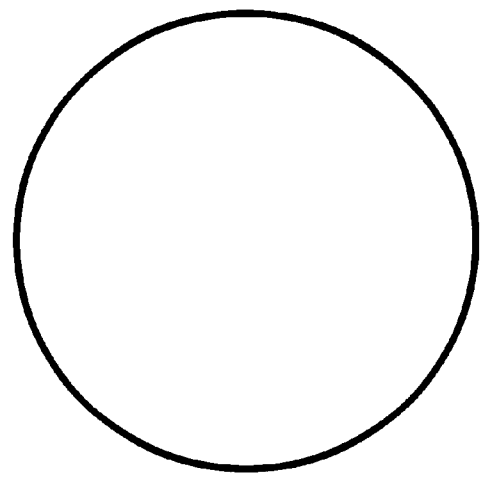
FIG. 10B shows the LC hologram pattern corresponding to FIG. 10A.
Figure 11A:
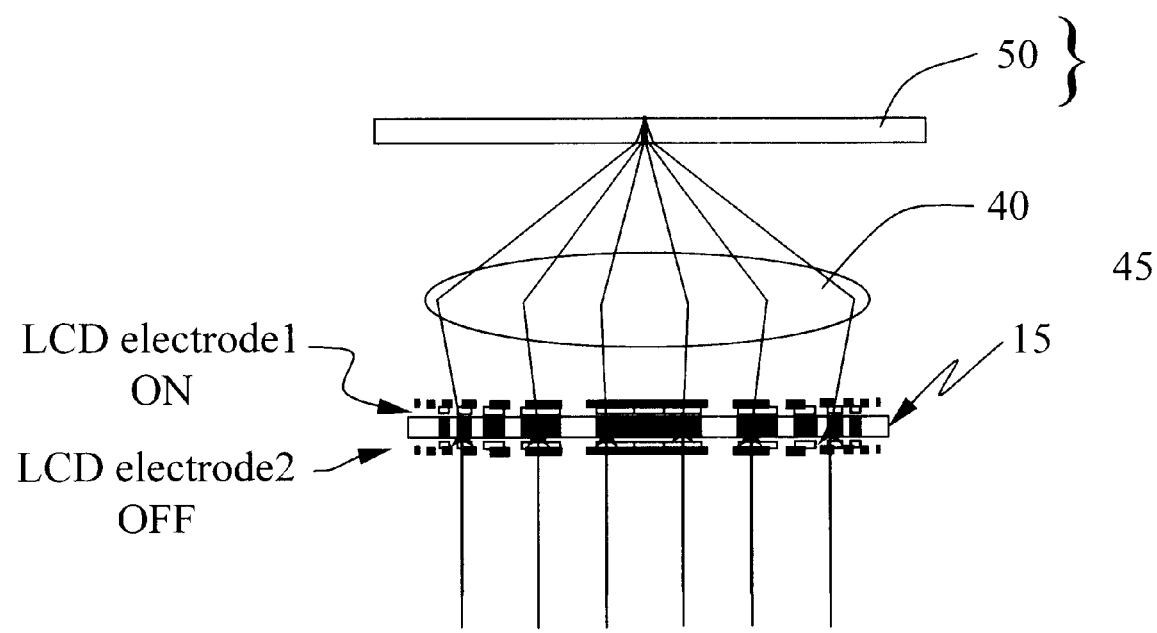
FIG. 11A shows how a compound objective lens composed of an LC hologram and an objective lens reads an optical disc when a first electric voltage is imposed on the LCD electrode.
Figure 11B:
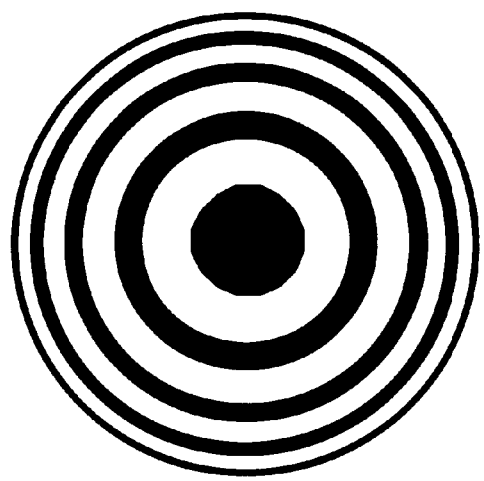
FIG. 11B shows the LC hologram pattern corresponding to FIG. 11A.
Figure 12A:
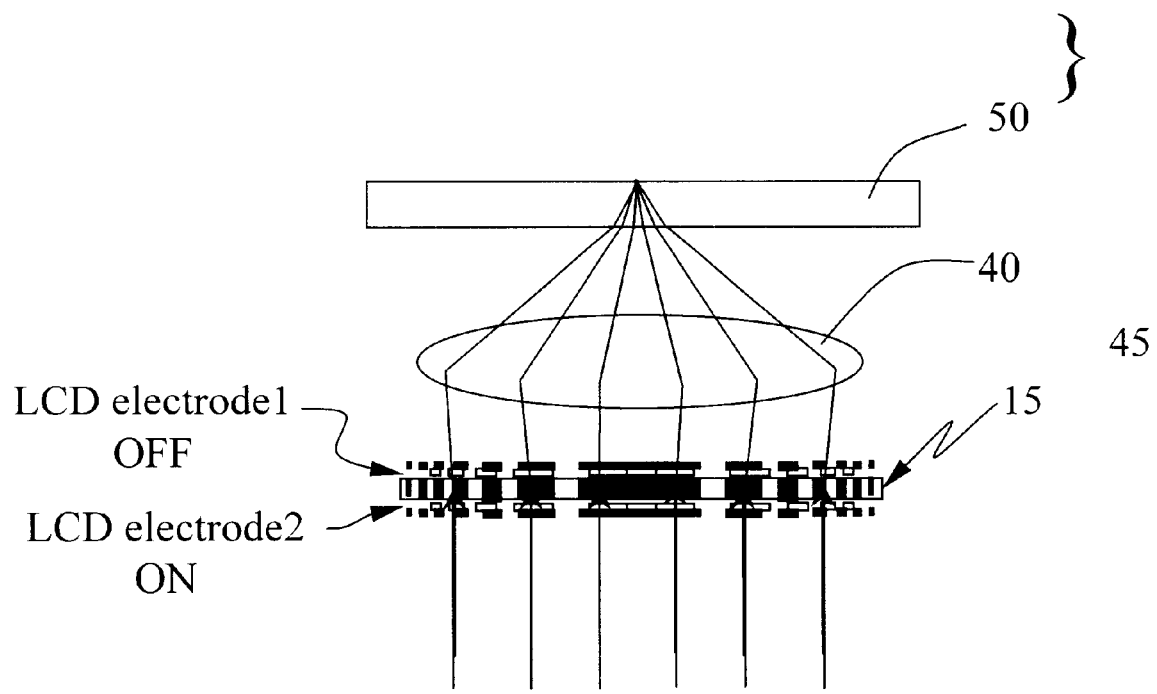
FIG. 12A shows how a compound objective lens composed of an LC hologram and an objective lens reads an optical disc when a second electric voltage is imposed on the LCD electrode.
Figure 12B:
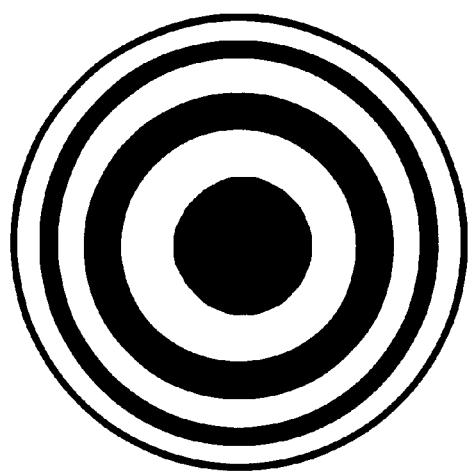
FIG. 12B shows the LC hologram pattern corresponding to FIG. 12A.

Furthermore, pursuant the above idea of the present invention, the LC hologram 15 using LC as a medium is combined with an objective lens 40 to form the compound objective lens 45 with variable NAs as illustrated in FIGS. 10A, 11A and 12A. Using the aforementioned switchable electrodes, the invention can read optical discs of different thickness. FIGS. 10B, 11B and 12B show the respective holographic patterns. The phase distributions of the LC hologram 15 can be obtained by computers which simulate the focal points on optical discs and optimize them. The phase polynomials can be expressed by the following formula:

$$\phi(r) = \sum_{n=1}^{N} C_n r^{2n}$$

Figure 14A:
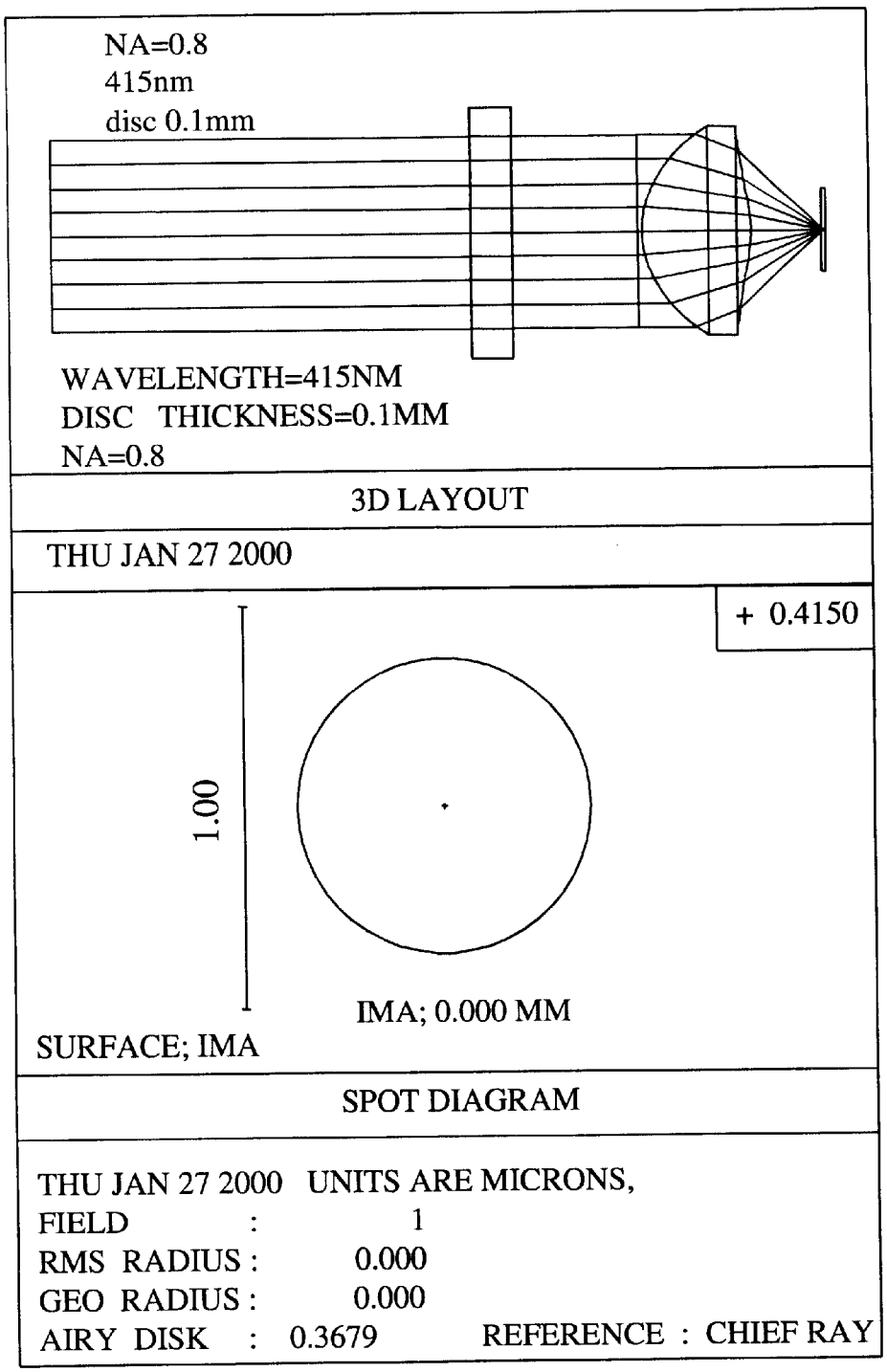
FIG. 14 shows computers' practically simulating results corresponding to FIGS. 10A, 11A and 12A.
Figure 14B:
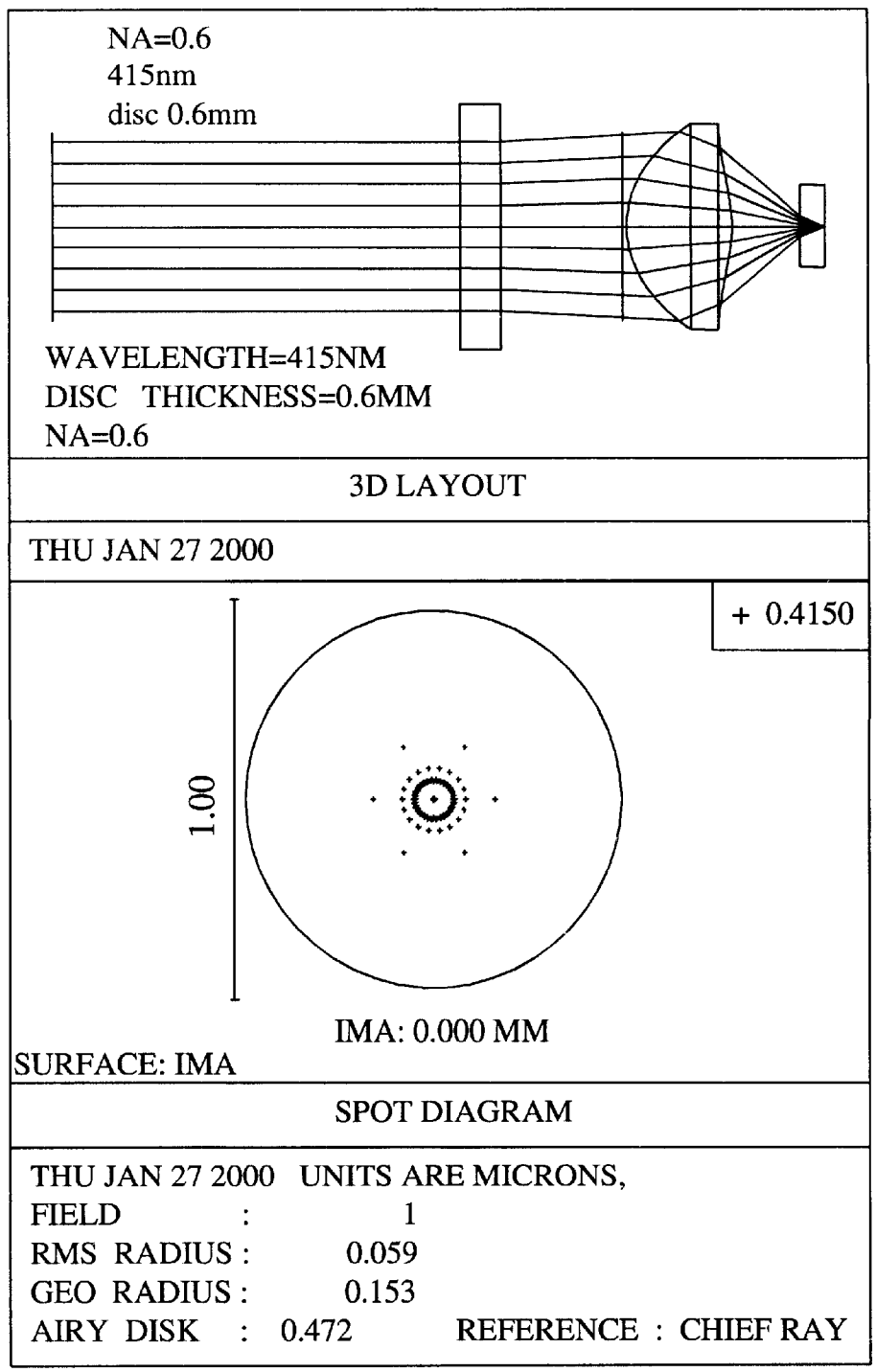
Figure 14C:
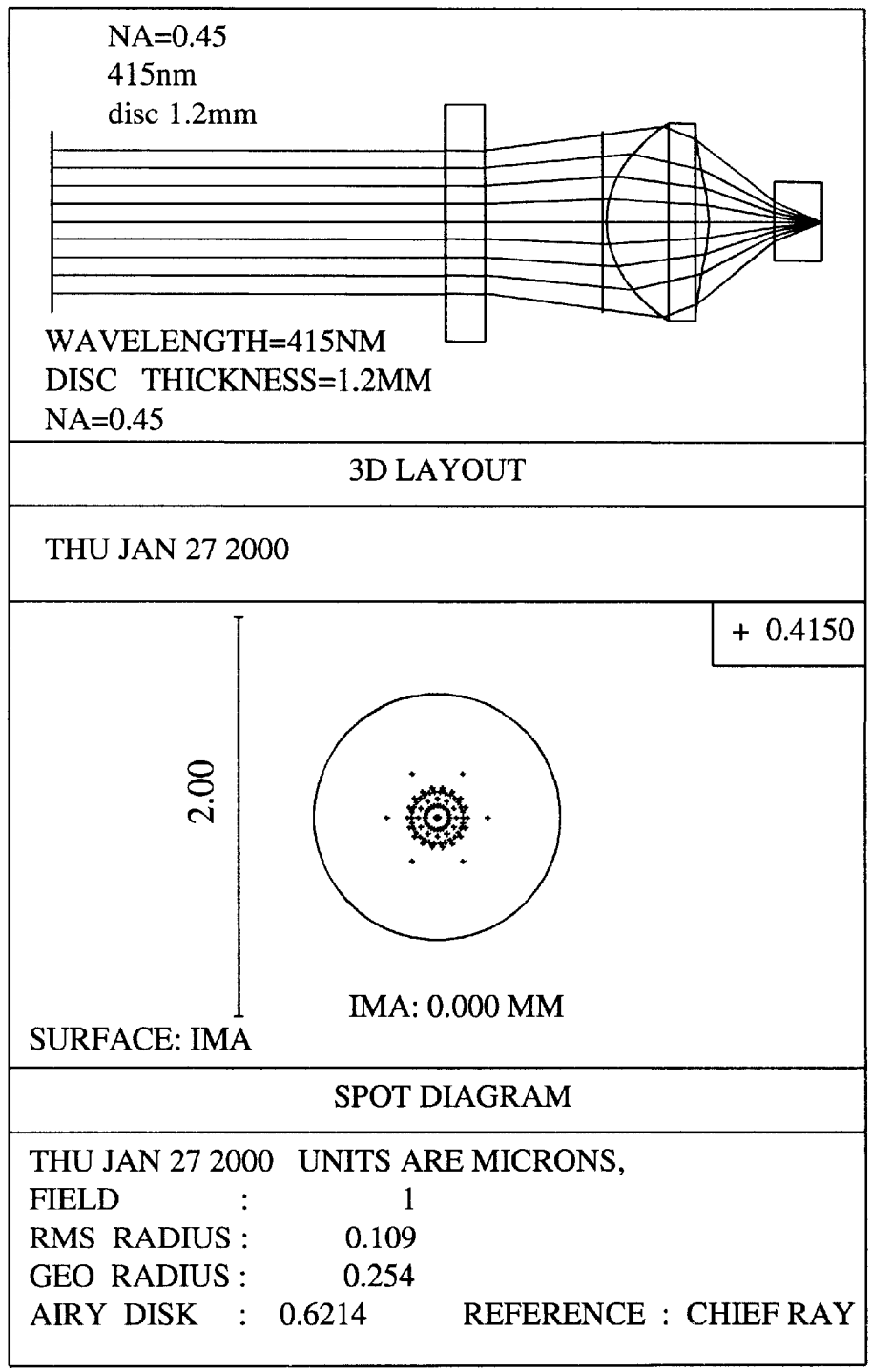

FIG. 14 shows the results that computers practically simulate FIGS. 10A, 11A and 12A, and also shows the phase coefficients of respective holographic optical element (HOE).

Figure 13:
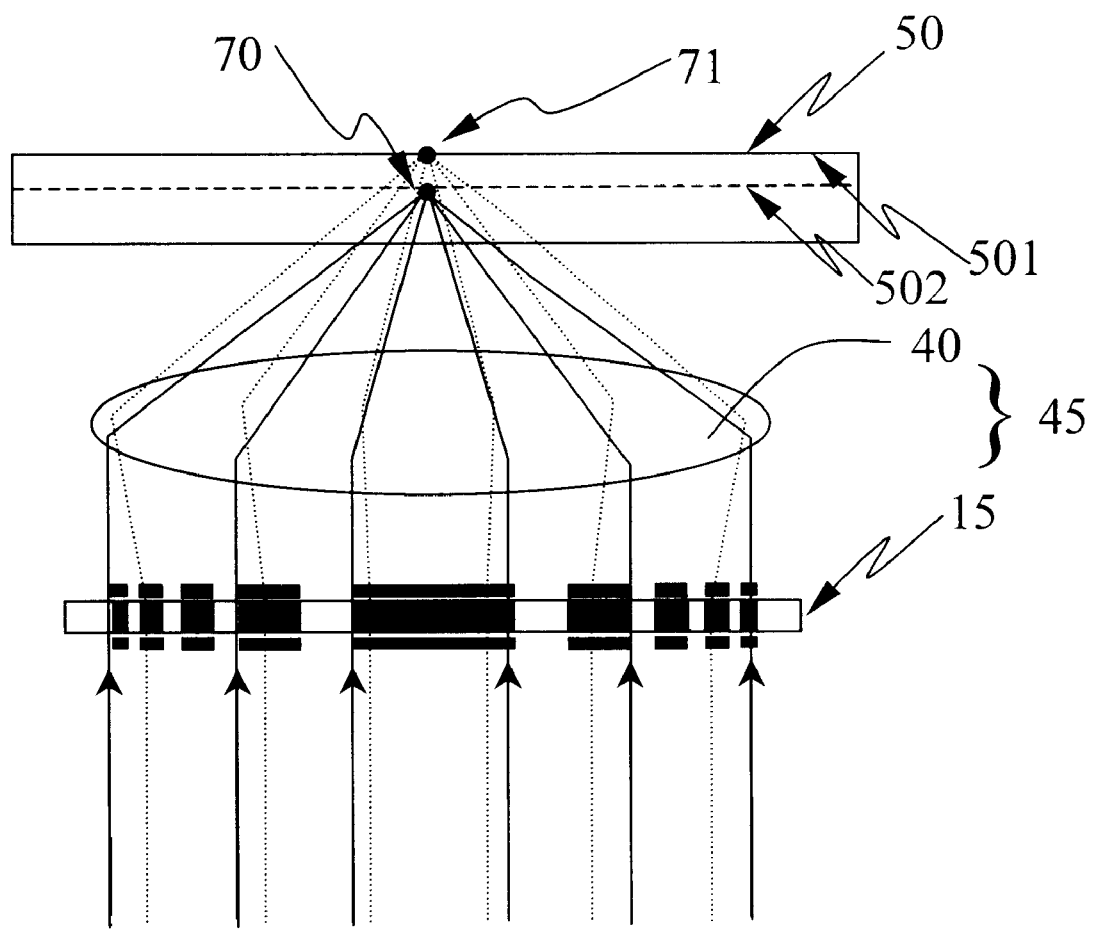
FIG. 13 is a schematic view showing that a compound lens composed of an LC hologram and an objective lens generates two focal points and reads data stored on a double-layer disc.

With reference to FIG. 13, a compound objective lens 45 composed of an LC hologram 15 and an objective lens 40 is shown to simultaneously read the data stored on the upper and lower data storage layers 51, 52 of a double-layered optical disc by simultaneously generating two focal points 70, 71 from the 0 and +1 order diffraction beams, doubling the data retrieving speed. In general, the distance between layers of usual double-layer discs cannot be controlled within a sufficiently small error. For example, the distance between the two layers of a DVD is about 55±15 μm, whose error is far beyond 1 μm, the normal depth of focus of usual objective lenses. Therefore, if one of the two focal points is focused on one data storage layer of the disc, the other one must be unable to correctly lock on the other data storage layer. At this moment, fine-tuning the diffraction angle of the LC hologram (i.e., slightly correcting the focal point of the compound objective lens) is necessary. This fine-tuning is achieved by changing the pattern on the LC hologram 15 via the LCD electrode design, the defocus signal from the photo detector and the feedback of a control system. This is another application of the dynamic diffraction function of the compound objective lens 45 using an LCD hologram 15.

EFFECTS ACHIEVED BY THE PRESENT INVENTION

The disclosed invention utilizes the feature that the optical refraction index of LC varies with the externally imposed voltage to modulate the LCD and to form a diffractive optical device. Various diffraction patterns can be obtained by varying the electrodes on the LCD. The present invention thus has the following advantages:

1. The LC hologram disclosed herein can be provided with a plurality of different electrodes, each of which corresponds to a particular phase profile. By switching the external voltage or controlling the magnitude of the voltage, a specific diffraction can be selected to generate the effect produced by a multi-level diffraction device or even a blazing diffractive device.
2. The LC hologram and the objective lens combine to form the compound objective lens. Compared with all types of dual-focus objective lenses, the disclosed invention can control the action of the LC hologram through the switching of the voltage applied on the external electrode. Thus, the dual-focus feature becomes a switchable function of the design and the invention is more energy-effective.
3. The invention can be improved to have multiple focal points. By switching a plurality of electrodes, the LC hologram produces multiple diffractions so that the compound objective lens can have correspondingly a plurality of different focal points with different NAs. It can further remove spherical aberrations induced by the thickness variations among different optical discs.

While the present invention has been shown and described with reference to the foregoing preferred embodiments, it is to be understood by those skilled in the art that other changes in form and detail may be made therein without departing from the spirit and scope of the invention as defined in the appended claims.

What is claimed is:

1. An optical device with variable numerical apertures (NAs) installed in an optical pick-up head for selectively changing the NA of the optical pick-up head, which optical device comprises:

a liquid crystal device (LCD) mounted on the optical path of the optical pick-up head; a ground electrode and a plurality of source electrodes made of transparent materials, the ground electrode and the source electrodes being distributed on opposite surfaces of the LCD, to change the LCD to become a diffractive grating when an external voltage is applied to one of the source electrodes;

a circuit control unit for providing driving voltages to the plurality of electrodes; and an objective lens for converging the beam passing through the LCD;

wherein each of the plurality of source electrodes is formed to correspond to a unique phase profile, so that by switching the external voltage to a specific source electrode or controlling the magnitude of the voltage, a specific diffraction level can be provided, thereby allowing the optical device to exhibit multiple diffraction levels;

further wherein the phase profile of the source electrode is selected such that a light beam passing through the diffraction grating exhibit a plurality of distinctly different orders of diffraction beams;

the objective lens is selected such that it exhibits distinctly different focal depths for the different order diffraction beams, to thereby allow the optical device to simultaneous read data stored at different layers in a storage medium.

2. The optical device according to claim 1, wherein the circuit control unit further provides the plurality of electrodes different driving voltages so that the LCD functions as a multi-level diffractive device.

3. The optical device according to claim 1, wherein the paired electrodes distributed on the upper and lower surfaces of the LCD are made to have unequal areas so that the LCD functions as a blazing diffractive device.

4. The optical device according to claim 1, wherein the plurality of electrodes are grouped into a plurality of electrode sets connected with different voltages, and by controlling the open and close of the circuits with the different voltages the LCD becomes a diffractive device with distinctive diffraction characters and angles, whereby the optical device obtains different NAs.

* * * * *